INVENTOR.
LEON H. REAGAN
BY J. Warren Whitesel
ATTORNEY

Dec. 6, 1955 L. H. REAGAN 2,726,285

DIAL CORD CIRCUIT

Filed Sept. 6, 1952 4 Sheets-Sheet 2

INVENTOR.
LEON H. REAGAN

BY J. Warren Whitesel

ATTORNEY

INVENTOR.
LEON H. REAGAN
BY J. Warren Whitesel
ATTORNEY

INVENTOR.
LEON H. REAGAN
BY J. Warren Whitesel
ATTORNEY

United States Patent Office 2,726,285

Patented Dec. 6, 1955

2,726,285

DIAL CORD CIRCUIT

Leon H. Reagan, Richland, Wash., assignor, by mesne assignments, to General Dynamics Corporation, a corporation of Delaware Application September 6, 1952, Serial No. 308,240

17 Claims. (Cl. 179—27)

This invention relates to a dial cord circuit and more particularly to a dial cord circuit which may be used to provide for signaling between a manual position and an intertoll network.

Originally, all telephone equipment was of the so-called manual type wherein an operator or multiplicity of operators performed all selective functions necessary to the connection of a calling party with a called party. Thereafter automatic switches were developed to provide a means for selecting a called line without the intervention of a human operator. Automatic equipment of this type conveniently is controlled by dial pulses transmitted by the calling subscriber; for a time the use of this automatic switching equipment was limited to local calls. When long distance calls were to be made, it was necessary to dial a long distance operator who then would complete the call to an operator at a distant point. That operator then would proceed to establish a call at that distant end by any suitable means which might be available to her.

Within the recent past, great effort has been exerted to develop an intertoll dialing system wherein a long distance calling operator may dial to control equipment at a distant end for the purpose of completing a connection with a distant called subscriber. Digit pulses can now be transmitted from the calling end to set automatic switches thereby selecting suitable circuits leading to a distant point. Then, further digit pulses may be transmitted from the calling end to set a switch train local to that distant point so that the operator at that distant end may be eliminated.

Many manual type telephone systems still do not provide any sort of dialing equipment; therefore, on calls from a manual position to a distant point, some adapter means must be provided for directing the switches at that distant point if the full benefit of an intertoll dial network is to be realized.

An object of this invention is to provide a digit transmitting device to adapt a purely manual board to an intertoll dial network.

Another object of this invention is to provide a dial cord circuit which may be installed in existing manual switchboards.

A further object of this invention is to provide a dial cord circuit featuring stop-start supervision and wipe-out control.

Still another object is to provide for operator recall at both the calling and called ends.

In general, I provide a dial cord circuit comprising a digit transmitting device, such as a dial, for example, which is adaptable to transmit digit pulses over the ring conductor of a special dial cord circuit to a two-way trunk circuit where the digit pulses are converted into signals which may be effective to control automatic switches by means of existing trunk signal circuits. I also provide a stop-start supervisory lamp which is controllable over the sleeve conductor of the special dial cord circuit from the two-way trunk circuit which again is adapted to utilize existing signal circuits such as are commonly found in intertoll trunking. My cord circuit is adapted to receive stop-start supervision while the operator is dialing. If an incorrect digit is dialed, operation of a wipe-out key simulates a disconnect condition so that all switching equipment in a distant exchange may be released.

A more complete understanding of my invention will be apparent from a description of the accompanying drawings.

Figure 3:
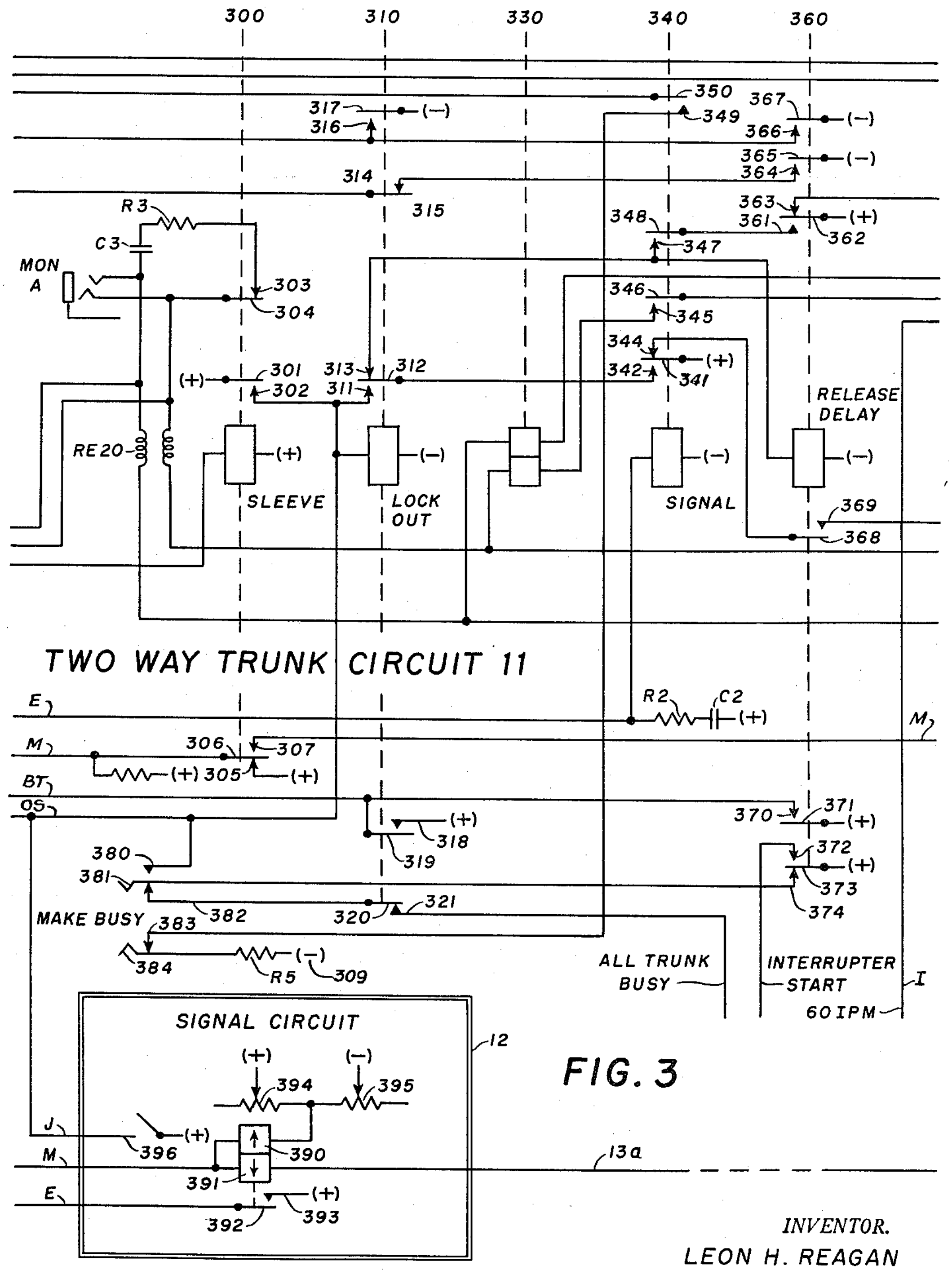
Figure 4:
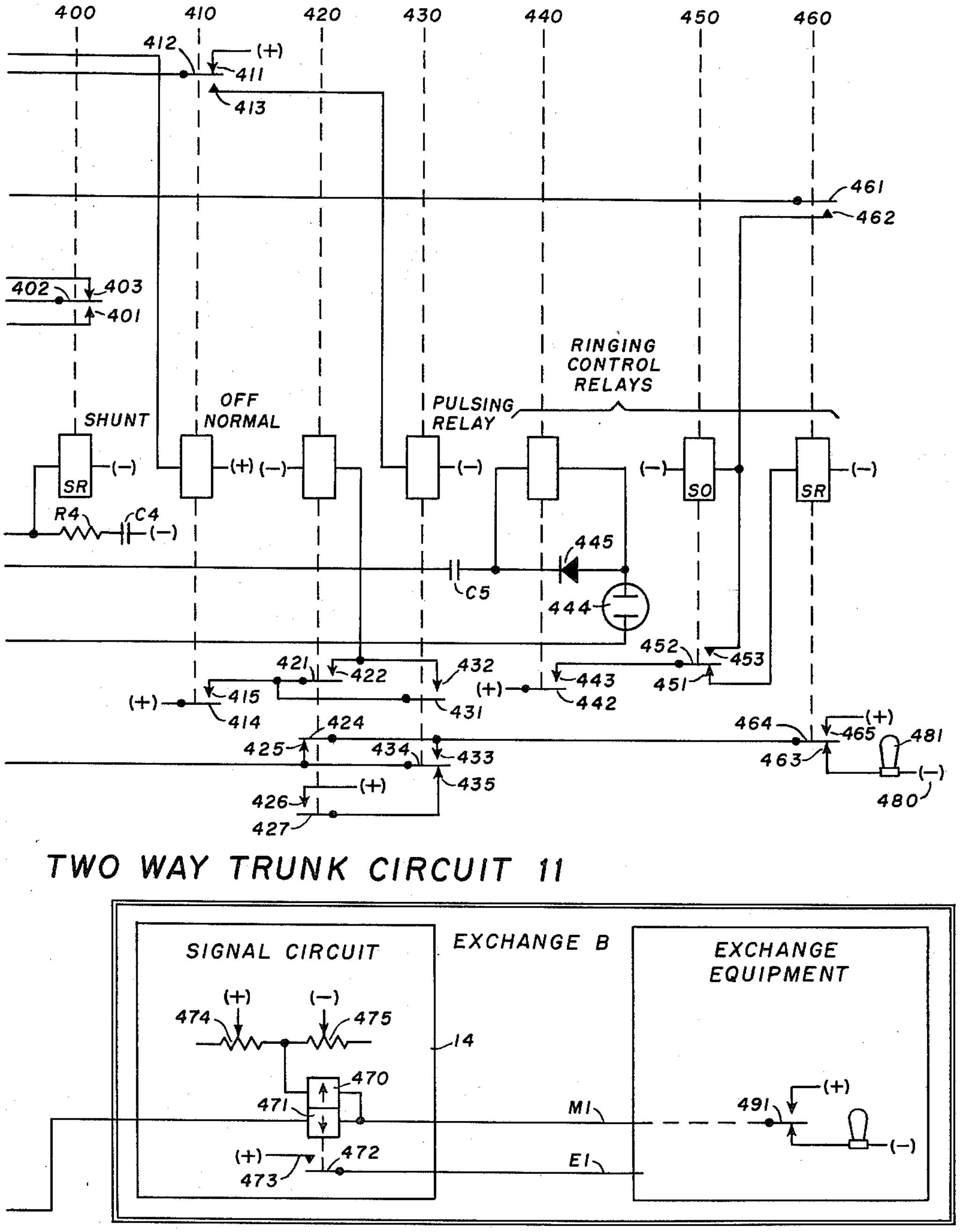

Figs. 3 and 4, when properly joined together, show a two-way trunk circuit adapting a manual position for signaling to an intertoll network.

Figures 2, 5:
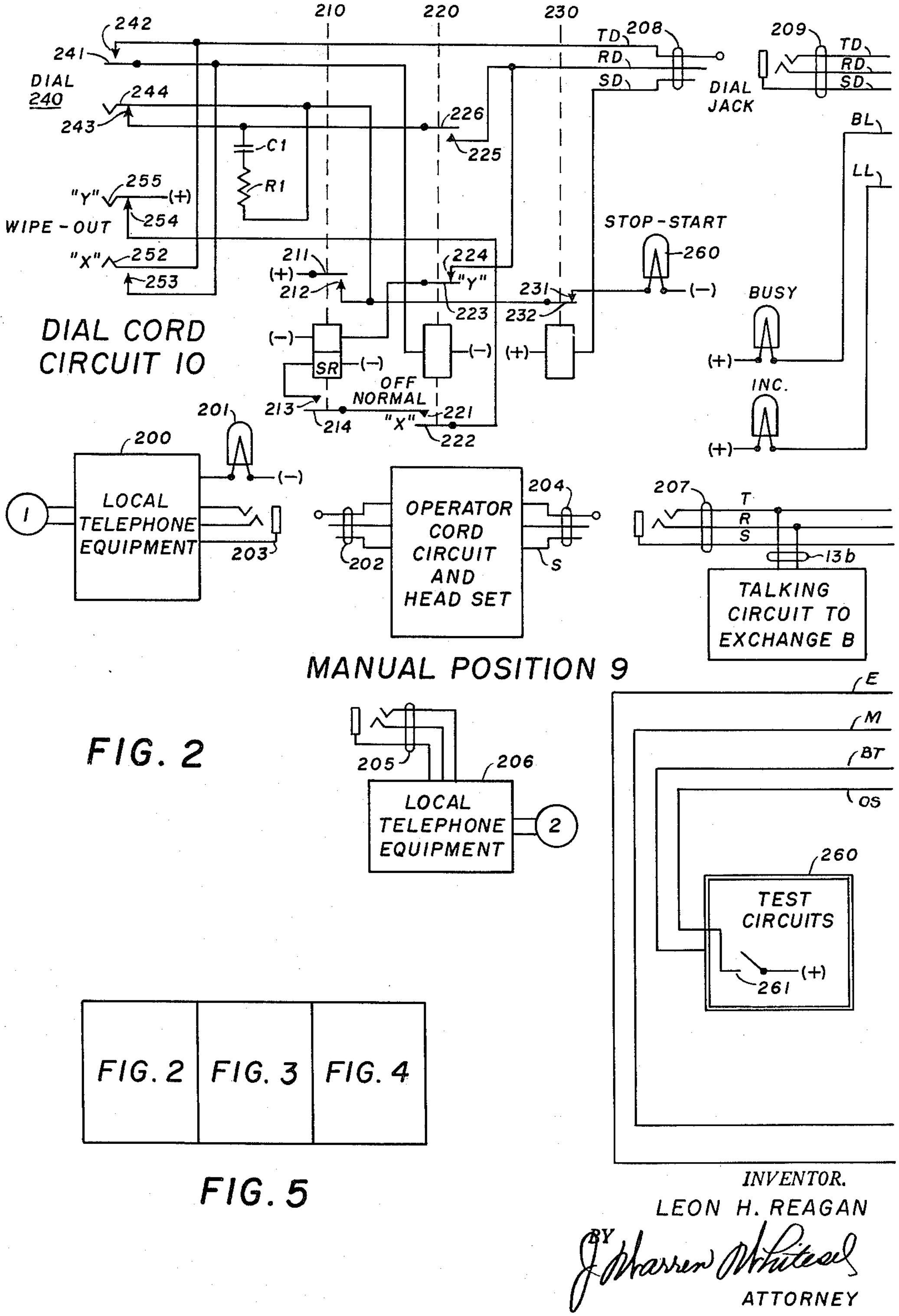
Fig. 2 shows a manual position incorporating an operator's position and a dial cord circuit.

Fig. 5 shows the manner in which Figs. 2, 3 and 4 should be joined so that a complete and operative circuit may be had.

Figure 1:
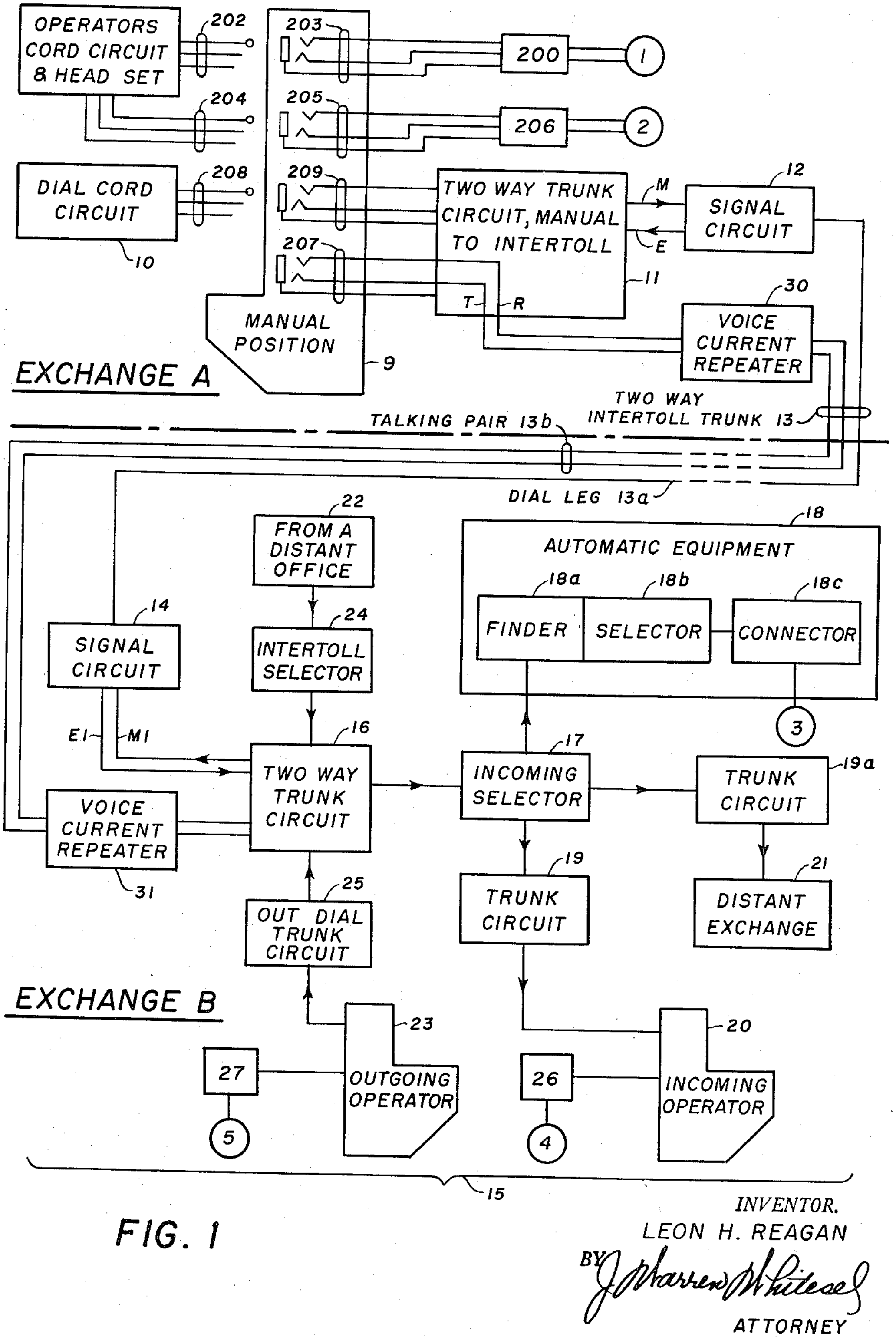
Fig. 1 shows a block diagram illustrating how my invention may be connected into an existing intertoll network.

Briefly, Fig. 1 shows a manual position 9 which may be connected to an intertoll network by means of trunk 13 comprising a dial leg **13*a* and a talking pair 13*b*. Dial cord circuit 10 is adapted to be associated with a two-way trunk circuit 11 by means of plug 208 and jack 209 after which the operator controls dial cord circuit 10 to produce digit pulses which are converted by two-way trunk circuit 11 into signals to be applied to conductor M so that a signal circuit 14 may receive these signals over dial leg 13*a*. Signal circuit 14 reconverts these signals into a form which may be extended over conductor E1 to operate incoming selector 17 and automatic telephone equipment 18. The digit pulses so transmitted are effective to operate incoming selector 17 which may select either automatic equipment 18, a trunk circuit 19 leading to a local incoming operator 20, or a distant exchange 21 by way of trunk circuit 19*a*. Automatic equipment 18 may comprise conventional equipment such as a finder switch 18*a*, a selector 18*b* and a connector 18*c* providing access to a called subscriber 3, for example. Incoming operator 20 may seize any suitable equipment 26 to reach a called subscriber 4**.

The circuit of Fig. 1 also is arranged to illustrate calls to manual position 9 which may have originated either in a distant exchange 22 or at exchange B, by way of an outgoing operator position 23 which may have been seized from calling subscriber 5 by means of any suitable equipment 27. The distant exchange 22 is extended through intertoll selector 24 to two-way trunk circuit 16, while outgoing operator 23 is connected to two-way trunk circuit 16 by means of out dial trunk circuit 25. In either case, the signal currents are transmitted over lead M1 and dial leg **13*a* to operate signal circuit 12 which in turn repeats the signal currents over the E lead to two-way trunk circuit 11**.

After the completion of any of the connections described above, conversation may follow by way of talking pair **13*b*. It should be understood that dial leg 13*a* is shown separately as an individual conductor to facilitate understanding; however, it may be any suitable arrangement such as a simplex, composite, sub-channel circuit or the like. If intertoll trunk 13 is of substantial length, it may be desirable to provide suitable voice current repeaters such as elements 30 and 31, for example. Needless to say, suitable signal current repeaters may be inserted in dial leg 13*a***.

Two features which might be worth noting, in passing, at this time with a detailed explanation reserved until later, concern stop-start supervision and operator recall. First, the dial cord circuit 10 is arranged to utilize the ring conductor RD (see Fig. 2) for transmission of dial pulses and to extend off-normal control over the tip conductor TD while stop-start supervision is by way of sleeve lead SD. This means that stop-start supervision may be received simultaneously with the dialing. Second, my invention provides a ringing control relay 450 (Fig. 4) which discriminates between calls which originate in exchange A and calls which terminate in exchange A. That is, a predetermined potential appears on armature 362 when a call originates in exchange A to operate relay 450. On the other hand, armature 362 operates on calls terminating in exchange A to prevent operation of relay 450. The net effect of this is to control selectively the type of operator recall which is extended to distant exchange B.

*Call to exchange B*

More specifically, the details of my invention are shown in the accompanying circuit drawings shown in Figs. 2, 3 and 4 which may be joined in the manner illustrated in Fig. 5. As in the case of most telephone systems, the positive pole of the exchange battery may be connected with ground and is indicated hereinafter by the symbol (+).

A local subscriber 1 may desire to place a call either to another local party such as subscriber 2 or to a distant exchange B. In either case, subscriber 1 initiates his call by removing the receiver of his telephone set, thereby operating local telephone equipment 200 to light lamp 201. This light signals the operator at manual position 9 who responds by connecting her plug 202 to calling jack 203 after which she converses with calling subscriber 1 to determine the destination of his call. If the call is to local subscriber 2, the operator connects calling plug 204 with jack 205 thereby seizing subscriber station 2 by means of local telephone equipment 206. However, if the call is for a distant exchange B, the operator inserts calling plug 204 in jack 207 to extend the call by means of an intertoll network. Plug 204 is the front plug conventionally associated with the operator's cord circuit so that she may extend the call to a desired subscriber station, converse with a called subscriber and perform supervisory functions. The operator also connects plug 208 and jack 209 to complete a path for extending switch directing signals. Dial cord circuit 10 associated with plug 208 is a special arrangement which adapts the manual position to control automatic switches utilized to complete a call, for example.

When plug 204 is inserted in jack 207, trunk circuit 11 is seized and made busy to all other points from which access may be had. Sleeve relay 300 operates as a recognization of this seizure over the circuit from (—) battery on sleeve S of plug 204 by way of jack 207 which is connected with relay 300 of Fig. 3.

It now is necessary to mark busy the intertoll trunk 13 at the distant end and to prepare that equipment for various changes and conditions. Therefore, relay 300 is provided with an armature 306 which is operated upon seizure of the trunk circuit to transfer conductor M from (+) on contact 305 to resistance battery over a circuit which may be traced from contact 307, to contact 425, armature 424, armature 464 and contact 463 to (—) battery 480 through resistance lamp 481. This resistance battery potential is connected to conductor M and hence to dial leg 13a which leads to the distant exchange where the relay 470 of signal circuit 14 operates armature 472 to extend (+) on contact 473 to conductor E1.

Means also is provided for marking two-way trunk circuit 11 busy to all local equipment from which circuit 11 may be seized.

Upon operating, sleeve relay 300 also completes a circuit to energize lock out relay 310 which may be traced from (+) on operated armature 301 and contact 302, through the winding of relay 310 to (—). Relay 310 operates to make the two-way trunk circuit 11 busy. Insofar as other operators are concerned, armature 317 makes with contact 316 to extend (—) battery over conductor BL to busy lamps at all operator positions. One such lamp is shown as associated with jack 207; however, it should be understood that a similar lamp is provided for each operator having access to two-way trunk circuit 11. Other equipment also is arranged to seize trunk circuit 11; for example, a test man may utilize test circuits 260 to seize and test trunk circuit 11; or he may seize circuit 11 from signal circuit 12. Therefore, relay 310 is provided with an armature 319 and contact 318 by means of which (+) busy marking may be extended over the BT lead to test circuits 260 and over the J lead to signal circuit 12. If the test man had already been using trunk circuit 11, the operator would not have selected jack 207, but would have selected some other trunk circuit because (+) would have been extended from test circuit 260 by way of closed contact 261 and conductor OS to operate lockout relay 310 which then would have marked trunk circuit 11 busy, as explained above. Relay 310 also attracts armature 315 to open the circuit leading to lamp INC by way of conductor LL. This lamp is provided for signaling the operator in case of calls from exchange B; therefore lighting it at this time would merely confuse the operator. Relay 310 prepares a holding circuit for itself by way of armature 312.

Having seized two-way trunk circuit 11, the operator must now prepare to transmit digit pulses to the distant end to control exchange equipment thereat for the purpose of seizing a called line. To prepare for such signaling, plug 208 is connected with jack 209.

The equipment shown is now in condition to transmit digit pulses; therefore, it is necessary to notify the operator of this fact by the operation of a suitable signal device such as stop-start lamp 260, for example, so that she may proceed to transmit suitable digit pulses. For this purpose, relay 210 operates over a circuit which may be traced from (—) battery through the upper winding of relay 210 to armature 223, contact 224, ring dial conductor RD, plug 208, jack 209, conductor RD, armature 412, and contact 411 to (+). Relay 210 attracts armature 211 which makes with contact 212 to light the stop-start lamp 260.

The operator now may transmit digit pulses by any suitable means, such as a key sender, a dial, etc. For the sake of simplicity, the drawing shows the digit transmitting device as dial 240 which is provided with off-normal spring 241 and contact 242 and with impulse spring 243 and contact 244. It will be obvious that any other suitable digit transmitting device may be used.

To transmit the first digit, the operator inserts her finger in the proper digit hole and rotates the dial off-normal winding a driving spring (not shown) as she does so. Off-normal supervision is extended by this rotation which closes off-normal spring 241 and contact 242 thereby completing a circuit to relay 220 via (—) battery, the winding of relay 220, contacts 241 and 242, conductor TD to (+) by way of off-normal relay 410. Relay 220 operates to attract its armatures which are arranged so that the preliminary or "X" contact 221 is closed before the "Y" contact 224 is opened. The "X" contact 221 completes an obvious path for holding relay 210 operated from (+) on dial spring 255. Shortly thereafter the "Y" contact 224 is broken from armature 223 thereby opening the circuit through the upper coil of relay 210 by which it was operated from ring dial lead RD. Relay 220 also completes a circuit at contact 225 and operated armature 226 from ring dial lead RD to contact 243 and impulse spring 244 which leads to (+) by way of contact 212 and armature 211. This provides a path for the transmission of digit pulses.

Means is provided for preparing two-way trunk circuit 11 for the first digit pulse train is about to be transmitted. This notification is by way of (—) battery which is extended through the winding of relay 220 and off-normal spring 241 which closed with contact 242 to complete a circuit to tip dial conductor TD through plug 208 which is connected with jack 209 to (+) by way of the winding of off-normal relay 410. Relay 410 operates thereby attracting its armature 412 which makes with contact 413 to cause the energization of pulsing relay 430. This relay operates over a circuit which may be traced from (−) battery through the winding of relay 430, contact 413 and operated armature 412, ring dial lead RD, dial jack 209 and plug 208, contact 225 and operated armature 226, contact 243 and impulsing spring 244, contact 212 and operated armature 211 to (+). Relay 410 also prepares a circuit for operating relay 420 which is completed when relay 430 operates, the circuit being traced from (−) battery through the winding of relay 420, contact 432 and operated armature 431, to (+) by way of contact 415 and operated armature 414. Relay 420 operates to hold at its contacts 422 and 421 independent of armature 431 and hence independent of pulsing relay 430. Relay 420 attracts armature 424 thereby breaking one of the connections between conductor M and (−) battery at resistance lamp 481, whereby resistance battery may be connected to lead M by way of pulse repeating armature 434 whenever relay 430 is operated. Relay 420 also attracts armature 427 to make with contact 426 for the purpose of extending (+) to conductor M through armature 434 whenever pulse repeating relay 430 is released.

The operator may now release dial 240 which returns to normal under the influence of its driving spring, thereby transmitting a train of digit pulses. That is, impulse spring 244 is broken from contact 243 a number of times, depending upon the digit dialed by the operator. Capacitor C1 and resistance R1 are provided to reduce sparking by the contact 243 and spring 244 at this time. More specifically, ground from contacts 212 is interrupted to produce dial pulses which are extended over ring dial lead RD from operated armature 211 each time that impulsing spring 244 breaks from contact 243. On each pulse, the circuit to pulsing relay 430 is opened, thereby causing this relay to release and drop its armature 434 on each open period of the impulse springs. At the end of each dial pulse, relay 430 is operated again to attract armature 434. More specifically, at the start of each dial pulse when spring 244 breaks from contact 243, relay 430 releases to connect (+) over contact 426 and operated armature 427 to conductor M by way of contact 435, armature 434, contact 307 and operated armature 306. Each time that dial 240 closes impulse spring 244 with contact 243 to cause pulsing relay 430 to operate, a circuit is completed from (−) battery 480 to conductor M by way of resistance lamp 481, contact 463, armature 464, contact 433, operated armature 434, contact 307, and armature 306, armature 424 being then broken from contact 425 by the previous operation of relay 420. At the end of the pulses in the first digit pulse train, relay 430 remains operated.

Signal circuits 12 and 14 are of the type to provide what is commonly referred to as polar duplex signaling which normally is transmitted over a dial leg such as conductor 13*a*, for example. Each signal circuit may comprise a polarized relay having two windings which normally are differentially energized, thus preventing its operation under normal conditions. More specifically, consider the signal circuit when winding 470 is energized in the direction of the arrow, and winding 471 is energized oppositely in the direction of its arrow over a crcuit which may be traced from (−) battery through resistance 481, conductor M, winding 391, dial leg 13*a*, windings 471 and 470, and potentiometer 474 to (+) and potentiometer 475 to (−). These potentiometers are preferably adjusted so that the current in winding 470 equals the current in winding 471; therefore, the resulting flux in each of the two windings is equal and opposite since the windings are turned in opposite relation. Windings 390 and 391 of signal circuit 12 are arranged in the manner just explained in connection with the relay of signal circuit 14. This arrangement is such that battery connected to lead M does not operate the relay of signal circuit 12 which now is differentially energized at this time, but does operate the relay of signal circuit 14 because of the direction in which battery is extended. On calls from exchange B, (−) battery is extended over conductor M1 at which time the relay of signal circuit 14 is differentially energized and hence not operated but the relay of signal circuit 12 is operated. Sometimes it may be desirable to provide a third winding for these two relays in case the ground connected to the (+) side of the batteries at exchange A and exchange B are at different potentials. For the sake of simplicity, and to facilitate explanation, this third winding has not been shown.

In review, the operator transmits a selected digit by means of dial 240 which pulses relay 430 a number of times, determined by the digit transmitted. On each pulse, relay 430 transfers conductor M from resistance (−) battery to (+) at armature 434. The fact that (−) battery is applied to conductor M from the end shown, determines that operation of the relay of signal circuit 12 will not be effected but the relay of signal circuit 14 will operate. The relay in this latter circuit attracts armature 472 to repeat digit pulses over conductor E1 for the purpose of directing automatic switching equipment such as incoming seelctor 17 in exchange B thereby extending the call to an automatic switch train, an incoming operator, a more distant exchange, or still other equipment, as the case may be (see Fig. 1).

At the end of the digit pulse train, dial 240 returns to its normal position under the influence of its driving spring, and off-normal spring 241 breaks from contact 242 thereby causing relay 220 to drop. Relay 220 returns control of relay 210 to the RD conductor and opens the circuit extending from contact 243 to ring dial lead RD. Since the off-normal springs removed (−) battery which was previously extended by way of the winding of relay 220, relay 410 drops to notify trunk circuit 11 of the fact that the first digit pulse train has ended. Relay 420 is released when armature 414 breaks from contact 415 and pulse relay 430 is released when armature 412 breaks from contact 413. Conductor M is returned to (−) battery 480 by way of armature 424 and contact 425. Armature 412 returns (+) on contact 411 once again to hold relay 210 operated. Since this relay is slow release, it does not drop armature 211 during this interval; therefore, the stop-start light remains lit as a signal to the operator that she may dial. The operator now proceeds to dial the remainder of the digits contained in the calling number after which plug 208 may be disconnected from jack 209. Each digit is transmitted as in the case of the first digit which was described above in detail.

The equipment in exchange B may complete a connection to the called party under influence of these digit pulses after which the called party is signaled by any suitable means. He answers by removing his receiver. This causes (−) battery to be connected by any suitable means such as armature 491 to conductor M1 at exchange B for operating the relay of signal circuit 12 to provide answer supervision. Armature 392 makes with contact 393 to connect (+) to conductor E, thus operating signal relay 340 which completes a path through retardation coil 330 at armature 346 and contact 345, completes an alternate holding path for lockout relay 310, closes a path to prepare relay 360, and also connects sleeve dial lead SD to battery by way of resistance R5, contact 349 and armature 350. The relays in both of the signal circuits 12 and 14 are operated at this time as an indication that both the calling and called subscribers are off-hook.

*Disconnection from exchange B*

Conversation follows after which the various parties hang up and all equipment is released.

Let it be assumed that the called party is the first to disconnect. In this case, equipment (not shown) at the distant end is released to connect (+) to conductor M1 which is effective to release the relay of signal circuit 12.

Armature 392 is released thereby removing (+) from conductor E to release relay 340. Relay 340 opens one of the alternate holding circuits for relay 310 which remains operated from operated armature 301. The circuit through retardation coil 330 is broken at armature 346 to give disconnect supervision to the operator in manual position 9. The operator notices this supervisory signal (part of the operator cord circuit, not shown) and removes plug 204 from jack 207, thus opening the energizing circuit for sleeve relay 300 which restores to return (+) on contact 305 to armature 306, conductor M and dial leg 13*a*, thereby releasing the equipment in exchange B. Sleeve relay 300 also opens the second alternate holding circuit for relay 310 at armature 301. Lockout relay 310 now restores to release the busy marking and return trunk circuit 11 to normal unbusy condition. For this purpose, relay 310 releases armature 317 which disconnects (—) battery on contact 316 from conductor BL thereby extinguishing the busy lamp. Relay 310 releases armature 320 to reconnect (+) to the all trunk busy lead and removes (+) on contact 318 from the BT lead thereby making trunk circuit 11 available to any test equipment. The circuit is now ready for the next call.

*Disconnect from operator position 9*

It now may be assumed that disconnection is first made by the operator at manual position 9 who removes plug 204 from jack 207, thereby releasing sleeve relay 300 which formerly was held from (—) battery in the operator cord circuit over an obvious circuit. Relay 300 transfers the M lead to (+) on contact 305 at armature 306 as a disconnect supervisory signal to the distant office. Relay 300 also opens one of the alternate holding paths for lockout relay 310; however, it remains held under the influence of relay 340 over a circuit which may be traced from (—) battery through the winding of relay 310, contact 311, operated armature 312, contact 342, operated armature 341 to (+). The equipment at the distant end, exchange B, receives the supervisory signal applied at armature 306 and performs all functions necessary to release the called end. Relay 340 now functions as described above in the section marked "Disconnect from exchange B."

*Stop-start signaling*

Sometimes the equipment of exchange B is not ready to receive dial pulses at once; therefore, means is provided to notify the operator at manual position 9 of this fact so that she will not transmit the dial pulses before they may be utilized. In this case, a circuit is completed for applying (—) battery to conductor M1 through a resistance at exchange B in a manner similar to the arrangement whereby battery was applied to conductor M by way of resistance lamp 481, contact 463, armature 464, contact 433, operated armature 434, contact 307, and operated armature 306. The direction of the current this time is such that the relay of signal circuit 14 remains unoperated, while the relay of signal circuit 12 operates to attract its armature 392 thereby extending (+) from contact 393 over the E wiring to signal relay 340. Relay 340 operates to attract its armature 350 which makes with contact 349 thereby extending resistance battery over the sleeve lead to relay 230. More specifically, battery 309 is connected by way of resistance R5 to spring 384 and contact 383 of the make busy key to contact 349 and operated armature 350, sleeve dial lead SD, jack 209, plug 208 to (+) by way of relay 230. Relay 230 operates to attract its armature 232 which breaks from contact 231, thereby opening the supply circuit for the stop-start lamp 260. When the lamp is extinguished, the operator ceases to dial.

Later, the equipment of exchange B may be in a condition to receive further dial pulses at which time resistance battery is removed from conductor M1 thereby causing release of the relay of signal circuit 12. This removes (+) on contact 393 from conductor E thus releasing signal relay 340 which drops its armature 350 to open the sleeve dial circuit at contact 349. Relay 230 releases, returning armature 232 to its normal condition where a circuit is completed at contact 231 thereby lighting the stop-start lamp 260. When the operator sees that lamp 260 is again lit, she proceeds to transmit the next digit.

*Wipe-out*

Sometimes the operator makes a mistake transmitting digits whereupon it is necessary to provide some sort of a correcting means by which the call may be cancelled. For this purpose, applicant provides wipe-out key 250 which may be operated to transmit a disconnect signal. As in the case of contacts on relay 220, the notation "X" on the drawing indicates that spring 252 makes with contact 253 before "Y" spring 255 breaks from contact 254. The "X" contact maintains a holding circuit to relay 220 while spring 255 and contact 254 open to release the holding circuit for relay 210. This relay is not held by ground on ring dial lead RD since relay 220 is held at the "X" contact 253; hence contacts 224 are open. Relay 210 restores and extinguishes the stop-start lamp by releasing armature 211. Armature 211 also removes (+) from the ring dial lead RD thereby releasing pulsing relay 430 to transmit a disconnect signal to exchange B. Dial pulses are not effective to transmit a disconnect signal since relay 430 reoperates at the end of each dial pulse before certain slow release equipment at exchange B has had time to release, while in the case of wipe-out, relay 430 is released long enough to permit the release of this slow-to-release equipment. After a brief interval, the wipe-out key 250 is returned to normal whereupon the circuit for relays 220 and 410 is broken at contact 253 and spring 252 (since dial 240 is not rotated off-normal, spring 241 and contact 242 are open). Relay 220 drops armature 223 once again to connect relay 210 to ring dial lead RD which leads to (+) on contact 411 by way of armature 412. Relay 210 reoperates to light stop-start lamp 260 once more.

*Call from exchange B*

The two-way trunk circuit 11 also is arranged to receive calls which were extended by any suitable means from exchange B. The distant office seizes trunk 13 from two-way trunk circuit 16 (see Fig. 1). This seizure connects (—) battery by way of a resistance (not shown) to conductor M1 thereby operating the relay of signal circuit 12—the relay of signal circuit 14 is not operated at this time due to the direction of current flow. Upon operating, the relay of signal circuit 12 closes armature 392 with contact 393 thereby extending (+) over the E lead to operate signal relay 340 to notify the two-way trunk circuit of the incoming call. Relay 340 operates and connects (—) battery by way of resistance R5 and spring 384, contact 383, contact 349, operated armature 350, to the sleeve dial lead SD. This resistance battery has no effect at this time since plug 208 is disconnected from jack 209. Relay 340 also closes armature 346 with contact 345 thereby completing a circuit for placing coil 330 across the T and R leads. Armature 341 prepares a circuit to hold relay 310 once it has operated and also completes a circuit for the energization of release delay relay 360 over the circuit traced from (+) on operated armature 341 over contact 342, armature 312, contact 313, and through the windings of relay 360 to (—) battery. Relay 360 operates to connect (—) battery on armature 367 to contact 366 and conductor BL, thereby lighting the busy lamp as an indication that this circuit has been seized. Operation of armature 365 completes a circuit for lighting the incoming lamp INC over conductor LL thereby informing the operator at manual position 9 of the fact that a call has seized two-way trunk circuit 11. Relay 360 operates to mark trunk circuit 11 as busy to all other points of access. In so operating relay 360 prepares a circuit for relay 400 at armature 368; however, this relay does not operate at this time since relay 340 has previously operated armature 341 thereby breaking the energizing circuit for relay 400. Relay 360 locks operated under the influence of relay 340 over a circuit which may be traced from (+) on operated armature 362, contact 361, operated armature 348, contact 347, through the winding of relay 360 to (—) battery. Armature 371 operates and connects (+) to contact 370 thereby marking this circuit busy to test circuits 260. Armature 373 connects with an interrupter circuit, so that conventional signals may be available, such as ringing current, timing pulses, etc.

Upon noting the glowing condition of incoming lamp INC, the operator at manual position 9 answers the call by inserting plug 202 into jack 207 thereby closing an obvious circuit to sleeve relay 300 which operates and closes armature 301 with contact 302 to operate lockout relay 310. The M lead connected to armature 306 is transferred from (+) on contact 305 to (—) battery 480 which is connected to contact 307 thereby returning answer supervision to the distant office. Lockout relay 310 operates to connect an alternate circuit to busy lamp by way of operated armature 317, contact 316 and conductor BL. The circuit to conductor LL and the incoming lamp INC is opened at armature 315 thereby retiring the incoming call signal. Relay 310 also closes a holding circuit for itself at contact 311 and operated armature 312 to (+) on operated armature 341 of relay 340. An alternate circuit is completed at operated armature 319 for extending (+) connected to the BT lead and any other equipment such as test circuits 260 which have access to this two-way trunk circuit 11.

The operator inquires as to the destination of the call and learns, let us assume, that subscriber 2 is the called party. The operator now inserts plug 204 into jack 205 and seizes local telephone equipment 206 which may be utilized to extend the call to subscriber 2 in the conventional manner.

*Disconnect from called end*

Conversation follows after which time it may be assumed that the called party 2 is the first to disconnect. The operator at manual position 9 responds by disconnecting plug 202 from jack 207 thereby opening the circuit to sleeve relay 300 which restores. The M lead is transferred at armature 306 from (—) battery 480 to (+) on contact 305 to give disconnect supervision to the distant office. Relay 300 releases armature 301 thereby opening one of the hold circuits for relay 310; however, this relay does not release since it is held under the control of exchange B by way of contact 311, operated armature 312 to (+) connected to armature 341. This is necessary since relay 310 remains operated to hold (—) battery on conductor BL to keep the busy lamp lit and to maintain (+) on conductor BT, thus preventing the use of two-way trunk circuit 11 until the distant office releases. When the distant office does release, (+) is connected to conductor M1 at exchange B thereby releasing the relay of signal circuit 12. This relay drops to open the circuit extending from (+) on contact 393. This breaks the circuit for signal relay 340 which restores to open the holding circuit to relays 360 and 310. Relay 340 also releases armature 346 thereby removing coil 330 from its connection across conductors T and R. Armature 341 makes with contact 344 to complete a circuit for the energization of relay 400 during the brief interval that relay 360 is releasing; however, this has no effect at this time and relay 400 releases shortly thereafter when release delay relay 360 drops. Armature 350 opens the circuit extending to sleeve dial lead SD once again making two-way trunk circuit 11 available to dial cord circuit 10. Relay 360 also removes a (—) battery connection from conductors BL and LL thus extinguishing both the busy and incoming lamps. Lamp INC operated briefly during the interval between the release of relays 310 and 360 occasioned by the slow release characteristics of relay 360. Relay 360 removes the alternate (+) on armature 371 which was used for notifying test circuit 260 of the existence of a call.

*Disconnect from calling end*

For the sake of explanation, it may now be assumed that the subscriber in exchange B was the first to disconnect. When this happens, the M1 lead is suitably connected to (+) in exchange B to release the relay of signal circuit 12, thereby removing (+) from the E lead when armature 392 returns to normal. Signal relay 340 restores to open a holding circuit for relay 310 at armature 341; however, it remains operated from armature 301 which is held by relay 300 under the influence of the called operator cord circuit at manual position 9. Relay 340 also opens the holding circuit for relay 360 which was formerly completed at operated armature 348. The release of armature 346 from contact 345 opens the path from the T and R leads through retardation coil 330 to operate a supervisory lamp (not shown). Relay 360 restores to remove a (—) battery connection from leads BL and LL and also to remove (+) from conductor BT which was formerly connected at operated armature 371. The operator at manual position 9 notes the lighting of the supervisory lamp and thereupon removes plug 202 from jack 207 thus opening the circuit for sleeve relay 300 which releases. Armature 301 drops to open the hold circuit for relay 310 which restores and releases armature 317 from connection with contact 316 thereby removing the circuit for lighting the busy lamp. Relay 310 also releases armature 319 thereby returning conductor BT to normal. When relay 300 released, (+) on contact 305 was returned to conductor M for the purpose of transmitting disconnect supervision to the distant office.

*Recall from manual position 9 when call originated in exchange A*

The operator at manual position 9 may desire to recall an operator at called exchange B, assuming that the call was from position 9 to an operator at exchange B, such as operator 20 who is reached by incoming selector 17 and trunk circuit 19, for example. Therefore, it is necessary to provide operator 9 with a means for signaling recall to incoming operator 20.

To initiate such a recall signal, operator 9 momentarily operates her ringing key (not shown) thereby transmitting ringing current over conductors T and R to operate relay 440. Rectifier 445 makes relay 440 responsive to the alternating current used for ringing. Gas tube 444 provides a means for eliminating substantially all loss insofar as voice frequency currents are concerned since the circuit is completely open until the tube is fired. Capacitor C5 prevents transmission battery from being connected through the winding of relay 440 from the operator's front cord circuit which terminates on plug 204. Relay 440 picks up on the ringing current to attract its armature 442 which makes with contact 443 thereby completing a circuit by way of armature 452 and contact 451 for the operation of relay 460. Relay 460 attracts its armature 461 which makes with contact 462 thereby completing an operating path for relay 450 over the circuit which may be traced from (—) battery through the winding of relay 450, contact 462, operated armature 461, contact 363, and armature 362 to (+). Relay 450 is slow-to-operate; therefore, after a brief interval of time, it operates to attract armature 452 breaking the circuit for relay 460 which releases after an interval determined by its slow release characteristics. Relay 450 is now held operated over a locking path which may be traced from (—) battery through the winding of relay 450, contact 453, operated armature 452, contact 443, to (+) on operated armature 442. It will be noted that armature 464 is attracted to make with contact 465 during the time interval required for slow operate relay 450 to operate and slow release relay 460 to release which usually is from 50 to 120 milliseconds in duration in most telephone circuits of this type. During this interval (+) is extended from contact 465 to operated armature 464, armature 424, contact 425, to conductor M by way of contact 307 and operated armature 306. This circuit is effective to operate the relay of signal circuit 14 which attracts armature 472 for the purpose of operating a relay at the distant end which corresponds to relay 340. This is effective to flash the operator as a recall signal.

*Recall from manual position 9 when call terminated in exchange A*

Means also is provided for signalling recall from manual position 9 when the call originated elsewhere. For example, subscriber 5 may reach outgoing operator 23 by means of any suitable equipment 27. Operator 23 then may inquire as to the destination of the call after which she completes the call in a more or less conventional manner. That is, the call may be to subscriber 2 and may be completed in the manner described above under the heading, "Call from exchange B." After the call is completed, operator 23 retires and directs her attention and activities elsewhere. If the operator at position 9 is to secure the aid of operator 23 at a later time, some sort of a signalling system is essential. Moreover, it is often necessary to inform the equipment involved as to the difference between recall from an originating and from a terminating exchange to avoid any improper release responsive to what might otherwise be a disconnect signal.

Means is provided to discriminate between incoming and outgoing calls through the unique operation of relay 450. If trunk circuit 11 is seized from distant exchange B, (+) on contact 393 is connected to operated armature 392 responsive to operation of the relay of signal circuit 12 which picks up on signals received over dial leg 13*a*. This (+) operates signal relay 340 by way of the E conductor. Relay 340 attracts armature 341 which makes with contact 342, thereby operating release delay relay 360 over a circuit including armature 312 and contact 313. Relay 360 locks over a circuit which may be traced from (−) battery, through the winding of relay 360, contact 347, operated armature 348 and contact 361 to (+) on operated armature 362. The operator at position 9 transmits ringing current and trunk circuit 11 operates as previously explained under the heading "Recall from Manual Position 9 When Call Originated in Exchange A;" however, this time relay 450 does not operate when relay 460 attracts armature 461 since the operating circuit of relay 450 is now open at operated armature 362. The net result is that armature 452 does not move; hence, relays 440 and 460 remain operated for the indefinite period during which the operator at position 9 holds her ringing key (not shown) operated.

To facilitate understanding it now may be well to review briefly the operation of trunk circuit 11 when position 9 was in the originating exchange. The operator connected plug 204 with jack 207 thereby operating sleeve relay 300 which in turn operated lockout relay 310. This relay attracts armature 312 which makes with contact 311 to lock relay 310 operated. Armature 312 also breaks from contact 313 thereby opening the operating circuit to release delay relay 360. Even if signal relay 340 were now to operate, relay 360 cannot be energized; hence (+) on armature 362 remains connected with contact 363. Therefore, when the operator actuates her ringing key, relay 440 operates to close a circuit for operating relay 460. Relay 460 closes a circuit at armature 461 for energizing slow-operate-relay 450 which attracts armature 452 thereby opening the circuit to slow-release-relay 460. Hence a single signal pulse is transmitted at contacts 463–465 for the time interval required for relay 450 to operate and for relay 460 to release which conveniently may be 50 to 120 milliseconds.

*Recall from exchange B*

Sometimes a signal may be transmitted from exchange B to recall the operator at manual position 9, in which case conductor M1 is switched between (+) and (−) battery in any suitable manner (not shown) to transmit a single pulse which usually is of from 50 to 120 milliseconds in duration. This releases the relay of signal circuit 12 thereby opening and closing the connection between contact 393 and armature 392 to release signal relay 340 once over conductor E. This relay follows the pulse, and in doing so opens and closes the circuit for release delay relay 360; however, if operated, it does not release at this time due to its slow release characteristics. When relay 340 releases, it completes a circuit for relay 400 which attracts armature 402 thereby extending 60 or 120 impulses per minute on conductor 1 to the lower winding of retard coil 330 by way of operated armature 346 and contact 345, (relay 340 is reoperated at the end of the 50 to 120 millisecond period) to flash the operator's supervisory lamp (not shown). Relay 400 is made slow-to-release by a resistance R4 and capacitance C4; therefore, flashing is transmitted during the release interval of this relay which conveniently may be adjusted to last for about two seconds, for example.

*Miscellaneous operations*

Certain other features are provided; however, these features have not been discussed heretofore since they are not necessary for a complete understanding of the circuit. One of these features is the monitor jack MON A. This jack provides a means by which maintenance personnel may listen in on the conversation to determine whether or not conditions are satisfactory.

Very often it is necessary to provide voice frequency amplifiers, such as 30 and 31, in trunk line 13 extending between exchanges A and B. Such voice current repeaters are given to howling if the line is not suitably terminated in the characteristic impedance for which the amplifier is designed. For this purpose, applicant provides a balancing network connected to the conductors T and R in the form of capacitor C3 and resistance R3. It is necessary to remove such a terminating network during conversation; therefore, armature 304 and contact 303 of relay 300 opens the circuit including the balancing network.

Another feature which was not explained before is the make busy key. This key provides a means whereby two-way trunk circuit 11 may be locked out of use whenever necessary. Operation of this key completes a circuit from (+) on armature 373 over contact 374 to the OS and J leads and also operates lockout relay 310 thereby marking the circuit as busy in the manner explained above.

Still another feature which has not been explained heretofore is the all-trunk-busy lead connected to contact 321 which is provided as an indication of the saturated condition when no equipment is available. That is, each trunk circuit accessible to manual position 9, and other similar operators, is adapted to place a (+) marking connection on all-trunk-busy lead if that trunk circuit is then idle. As each trunk circuit is seized this marking is removed. When all trunks become busy, no (+) marking connection is extended over this lead and a signal is operated to indicate that saturation has been reached; that is, armature 320 breaks from contact 321 thereby removing (+) which has been extended by way of armature 373 and contact 374.

Sometimes it is necessary to conduct tests on two-way trunk circuit 11 from signal circuit 12. Therefore, it is necessary to provide means in signal circuit 12 for seizing two-way trunk circuit 11. For this reason, I show a conductor J which may be connected to (+) by any suitable means such as contacts 396. This connection serves to operate lockout relay 310 which marks the circuit busy to other equipment by lighting the busy lamp at armature 317 and by marking the BT lead at armature 319.

When impulses are received at signal circuit 12 from the distant exchange B, relay 390 operates to pulse armature 392 in accordance with the signals received. This connects (+) to operate relay 340. Since pulsing contacts are given to sparking, it is necessary to provide a spark suppression circuit for armature 392 and contact 393. For this purpose, applicant shows a resistance R2 and capacitance C2 connected to the E wiring.

Other modifications will be obvious to those skilled in the art; therefore I intend to include within the scope of the following claims not only the embodiment of my invention which I have shown but also to include all other obvious modifications.

What I claim is:

1. In a telephone system, a manual switchboard, a trunk circuit, dial cord circuit, a circuit having a plurality of conductors for connecting said dial cord circuit with said trunk circuit, digit transmitting means in said dial-cord circuit for signaling over only one of said conductors and stop-start supervision means in said dial-cord circuit connected to another of said conductors.

2. The dial cord circuit of claim 1, and means in said dial-cord circuit for providing dial off-normal supervision connected to still another of said conductors, and means in said trunk circuit operated responsive to said dial off-normal supervision for preparing said trunk circuit to repeat said signals on said one conductor.

3. A telephone system comprising an intertoll dialing network, a signaling circuit for repeating digit signals into said intertoll network, a manual position having access via tip, ring and sleeve conductors to said intertoll network, dial-cord circuit means for adapting said manual position to transmit digit pulses over only one of said conductors to said signaling circuit, and means included in said dial-cord circuit for receiving stop-start supervision over another of said conductors at said manual position from said intertoll network.

4. In a telephone system of the type wherein a manual position has access to an intertoll network, a dial cord circuit and a trunk circuit for adapting the manual position to transmit and receive signals of a type which may be utilized by signal circuits commonly found in intertoll networks, means including a plug and jack having tip, ring and sleeve contacts for interconnecting said dial-cord and trunk circuits, said dial-cord circuit comprising means for transmitting digit impulses over only said ring contact and means for giving stop-start supervision over said sleeve contact.

5. A dial cord circuit comprising means for transmitting digit impulses, means for giving stop-start supervision, a dial cord having tip, ring and sleeve conductors for connecting said dial cord circuit with telephone equipment, said digit transmitting means being connected with only said ring conductor and said stop-start supervision means being connected with said sleeve conductor.

6. The dial cord circuit of claim 5 and means for providing dial off-normal supervision connected with said tip conductor and means responsive to said off-normal supervision for preparing said telephone equipment to repeat signals from said digit transmitting means.

7. In a telephone system, a first and a second telephone exchange with a supervisory path extending therebetween, an operator position in said first exchange, means at said operator position for transmitting at least two types of operator recall supervision signals over said supervisory path, means for discriminating between calls which originate in the said first office and calls which originated in said second office, means responsive to said discriminating means for selecting which of said types of operator recall signals is to be transmitted, a dial cord circuit including means for transmitting digit impulses, means for giving stop-start supervision, a cord having tip, ring and sleeve conductors for connecting said dial cord circuit with telephone equipment in said first exchange, said digit transmitting means being connected to said ring conductor, said stop-start supervision means being connected to said sleeve conductor, means for providing dial off-normal supervision connected with said tip conductor, and means responsive to said dial off-normal supervision for preparing said telephone equipment to repeat said digit impulses.

8. A manual switchboard comprising; a dial-cord circuit and a trunk circuit, means including a plug, jack and cord for interconnecting said dial-cord circuit and said trunk circuit, a first slow release relay in said dial-cord circuit, circuit means for operating said relay responsive to interconnection of said dial-cord circuit and said trunk circuit, a dial including impulsing contacts, means responsive to operation of said relay for preparing said dial to transmit digit pulses, a stop-start supervisory lamp and means responsive to operation of said relay for lighting said lamp under the influence of said trunk circuit.

9. The switchboard of claim 8 and means in said trunk circuit for receiving signals from a distant exchange, a second relay, circuit means for controlling said second relay responsive to said last named means, and means responsive to said second relay for extinguishing said stop-start supervisory lamp.

10. The switchboard of claim 9 and a third relay, means operated by said dial when off-normal for operating said third relay, means responsive to operation of said third relay for breaking said circuit means for operating said first relay, means for completing a holding path to said first relay before said last named means breaks said circuit means, and means responsive to operation of said third relay for connecting said dial to transmit digit pulses to said trunk circuit.

11. The switchboard of claim 10 and means in said trunk circuit for converting said digit pulses to another type of signals.

12. The switchboard of claim 10 and wipe-out means for operating said third relay and releasing said first relay.

13. A telephone system comprising a first exchange and a second exchange, a trunk line extending between said exchanges including means for conveying supervisory signals therebetween, a trunk circuit in said first exchange comprising means for receiving and for transmitting said supervisory pulses, a manual switchboard, a dial-cord circuit at said switchboard, means including a plug, jack and cord for interconnecting said dial-cord circuit and said trunk circuit, a first relay in said dial-cord circuit, means for operating said relay responsive to completion of said plug and jack connection, a dial including impulsing springs in said dial-cord circuit, a source of electrical potential, means responsive to operation of said first relay for connecting said source of electrical potential to said impulsing springs, a stop-start supervisory lamp, and means responsive to the operation of said relay for rendering said stop-start supervisory lamp effective.

14. The telephone system of claim 13 and a second relay in said dial-cord circuit, means in said trunk circuit for operating said second relay responsive to receipt of said supervisory signals, and means responsive to said second relay for controlling said stop-start supervisory lamp.

15. The telephone system of claim 14 and a third relay, means operated by said dial when off-normal for operating said third relay, means responsive to operation of said third relay for breaking said circuit means for operating said first relay, means for completing a holding path to said first relay before said last named means breaks said circuit means, and means responsive to operation of said third relay for connecting said dial to transmit digit pulses to said trunk circuit.

16. The telephone system of claim 15 and means in said trunk circuit for converting said digit pulses to another type of signals.

17. The telephone system of claim 15 and wipe-out means for operating said third relay and releasing said first relay.

References Cited in the file of this patent

UNITED STATES PATENTS

| | | |
|---|---|---|
| Re. 22,441 | King et al. | Feb. 22, 1946 |
| 1,883,158 | Ulrich | Oct. 18, 1932 |
| 2,273,139 | Peterson et al. | Feb. 17, 1942 |
| 2,302,587 | Ulrich | Nov. 17, 1942 |
| 2,632,813 | Bakker | Mar. 24, 1953 |